United States Patent [19]

Endo et al.

[11] Patent Number: 5,012,521
[45] Date of Patent: Apr. 30, 1991

[54] CONTEXT-BASE INPUT/OUTPUT SYSTEM

[75] Inventors: Yasuo Endo; Shinji Akimichi; Tadayoshi Hirose; Motonori Furukawa; Kyoko Yoshida, all of Chuo, Japan

[73] Assignee: Takenaka Corporation, Japan

[21] Appl. No.: 291,619

[22] Filed: Dec. 29, 1988

[30] Foreign Application Priority Data

Mar. 18, 1988 [JP] Japan ................................ 63-65524

[51] Int. Cl.⁵ .............................................. G06K 9/00
[52] U.S. Cl. .......................................... 382/1; 340/703; 382/13; 382/44; 382/57; 382/59
[58] Field of Search ................ 382/59, 61, 44, 47, 382/57, 13, 1; 340/707, 723, 731

[56] References Cited

U.S. PATENT DOCUMENTS

| | | | |
|---|---|---|---|
| 3,611,291 | 10/1971 | Frank | 382/57 |
| 3,930,237 | 12/1975 | Villers | 382/61 |
| 4,475,239 | 10/1984 | van Raamsdonk | 382/57 |
| 4,525,860 | 6/1985 | Boivie | 382/30 |
| 4,550,438 | 10/1985 | Convis et al. | 382/59 |
| 4,553,261 | 11/1985 | Froessl | 382/61 |
| 4,672,677 | 6/1987 | Yamakawa | 382/59 |

OTHER PUBLICATIONS

Mitchell, "Computer-Aided Architectural Design", pp. 329-332.

Primary Examiner—David K. Moore
Assistant Examiner—Joseph Mancuso
Attorney, Agent, or Firm—Oliff & Berridge

[57] ABSTRACT

When a pattern is manually drawn on a tablet with an electronic pen, a computer executes a graphic processing to display on a CRT a geometrically defined pattern which best resembles the manually drawn pattern. Moreover, a pattern element is erased, divided or copied by memorizing a graphic processing command in advance in a manner to correspond to a predetermined pattern or operator and by manually drawing this operator on the tablet with the electronic pen.

The pattern data can be inputted to the computer to display the pattern by the same operations as those for drawing on a paper with writing apparatus so that the pattern can be drawn on the basis of the human engineering without feeling any physical disorder.

16 Claims, 6 Drawing Sheets

CONTEXT-BASE INPUT/OUTPUT SYSTEM

BACKGROUND OF THE INVENTION

1. Field of the Invention

The present invention relates to a context-base input/output system and, more particularly, to a context-base input/output system for inputting a manually drawn sketch to a computer to convert it into a geometrically defined pattern and to display it.

2. Description of the Prior Art

Generally speaking, pattern input to the computer is accomplished by means of an electronic pen, a digitizer, a mouse or the like after either a menu (i.e., a table indicating the functions) on the screen of a CRT or a tablet menu on a tablet has been selected. In case a circle is to be displayed on a CRT by means of the electronic pen and the tablet, for example, the function to display the circle is selected from the menu, and a data corresponding to a central point of the circle and one point on its circumference are registered at a predetermined position of the tablet by means of the electronic pen. Then, the computer executes graphic processing to display the circle according to the input data on the CRT. According to a method using the tablet menu, on the other hand, difference from the foregoing method is limited to a point that the selection of function from the menu is executed on the tablet.

However, the aforementioned methods of selecting the graphic processing function according to the menus suffer from problems that a number of steps of selecting the function from the menu is more than a method of manually drawing a segment or circle directly on a paper by writing means so that they are not only troublesome but also felt with a physical disorder, thus making it difficult to use the tool. Moreover, the method of inputting the data is executed by inputting the data of specific points and is followed by the feeling of a physical disorder because operations are different from those in case the pattern is manually drawn.

SUMMARY OF THE INVENTION

The present invention is conceived to solve the above-specified problems and has as an object to provide a context-base input/output system capable of inputting a physical data, as if a pattern were to be drawn on a paper by writing means, to display a pattern thereof.

According to a major feature of the present invention, there is provided a context-base input/output system including: input means having an electronic pen and a tablet for converting a locus of the electronic pen on a tablet into dot data to input them; first determining means based on the input dot data for determining what of at least a segment, circle and arc is expressed by the locus; display means based on the determination result of the first determining means for displaying a pattern expressed by the locus in a display apparatus; memory means for memorizing graphic processing commands which correspond to a plurality of predetermined patterns, respectively; second determining means based on the determination result of the first determining means for determining whether or not the predetermined patterns are expressed by the locus; and processing means based on the determination result of the second determining means for graphic processing in response to the commands corresponding to the predetermined patterns expressed by the locus.

The input means of the present invention is composed of the electronic pen and the tablet, and the locus of the electronic pen on the tablet is converted into dot data before it is registered. Thus, the data of a manually drawn pattern are converted into the dot data and inputted by drawing the pattern on the tablet by the electronic pen. The first determining means is based upon the inputted dot data for determining what of at least the segment, circle and arc is expressed by the locus of the electronic pen on the tablet. The display means is based on the determination result of the first determining means for displaying on the display apparatus the pattern expressed by the locus of the electronic pen. Thus, even in case the manually drawn pattern, i.e., the locus of the electronic pen fails to express a geometrically accurate pattern, it is determined by the first determining means what pattern is expressed, that is to say, what geometric pattern the manually drawn pattern resembles. As a result, the manually drawn pattern is converted into the geometrically defined pattern and displayed on the display apparatus. Thus, the pattern can be inputted or outputted without using any menu.

On the other hand, the memory means memorizes or stores the graphic processing commands corresponding to a plurality of predetermined patterns, respectively. The second determining means is based on the determination result of the first determining means for determining whether or not the predetermined patterns are expressed by the locus of the electronic pen. The processing means is based on the determination result of the second determining means for graphic processing in response to the command corresponding to the predetermined drawing expressed by the locus of the electronic pen, if so expressed. Thus, the graphic processing command can be designated by drawing a specific pattern without using any menu.

Incidentally, the pattern will be herein termed to be a set of points, lines and planes as well as letters and symbols.

Other objects, features and advantages of the present invention will become apparent from the following description to be made with reference to the accompanying drawings.

BRIEF DESCRIPTION OF THE DRAWINGS

The accompanying drawings illustrate the preferred embodiment of the present invention, in which.

DESCRIPTION OF THE PREFERRED EMBODIMENT

Figure 2:
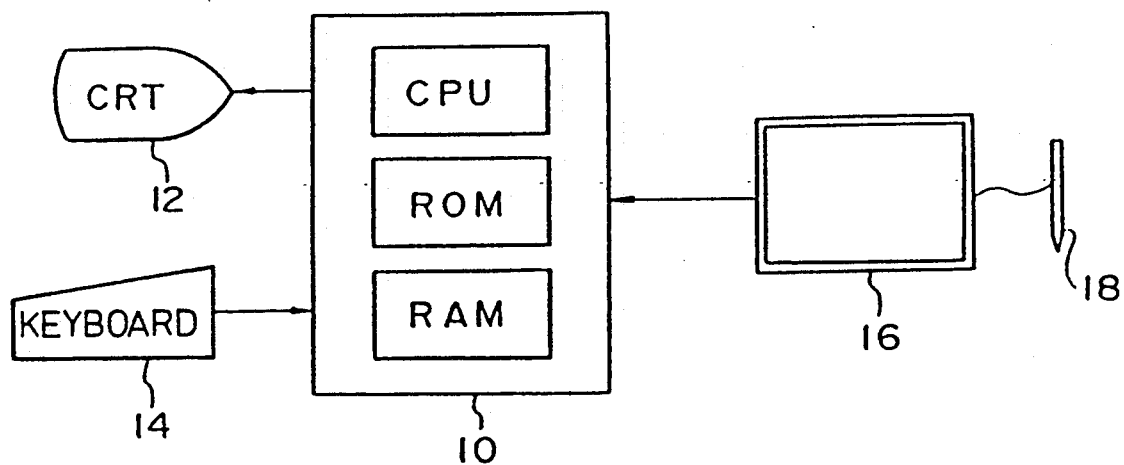
FIG. 2 is a block diagram schematically showing the embodiment of the present invention.

A context-base input/output system of the present invention will be described in detail in connection with an embodiment thereof with reference to the accompanying drawings. FIG. 2 is a schematic view showing the embodiment, in which a graphic processing computer 10 is composed of a CPU, a ROM and a RAM. The computer 10 is connected with a CRT 12, a keyboard 14 and a tablet 16. The tablet 16 is connected with an electric pen 18, and a tip of the electric pen 18 is movable on and in contact with a surface of the tablet 16 to convert a moving locus into dot data, which are then inputted to the computer 10. The computer 10 has the ROM stored in advance with both the program of a graphic processing control routine, as will be described hereinafter, and commands corresponding to specific patterns. The control routine will be described in the following.

Figure 1:
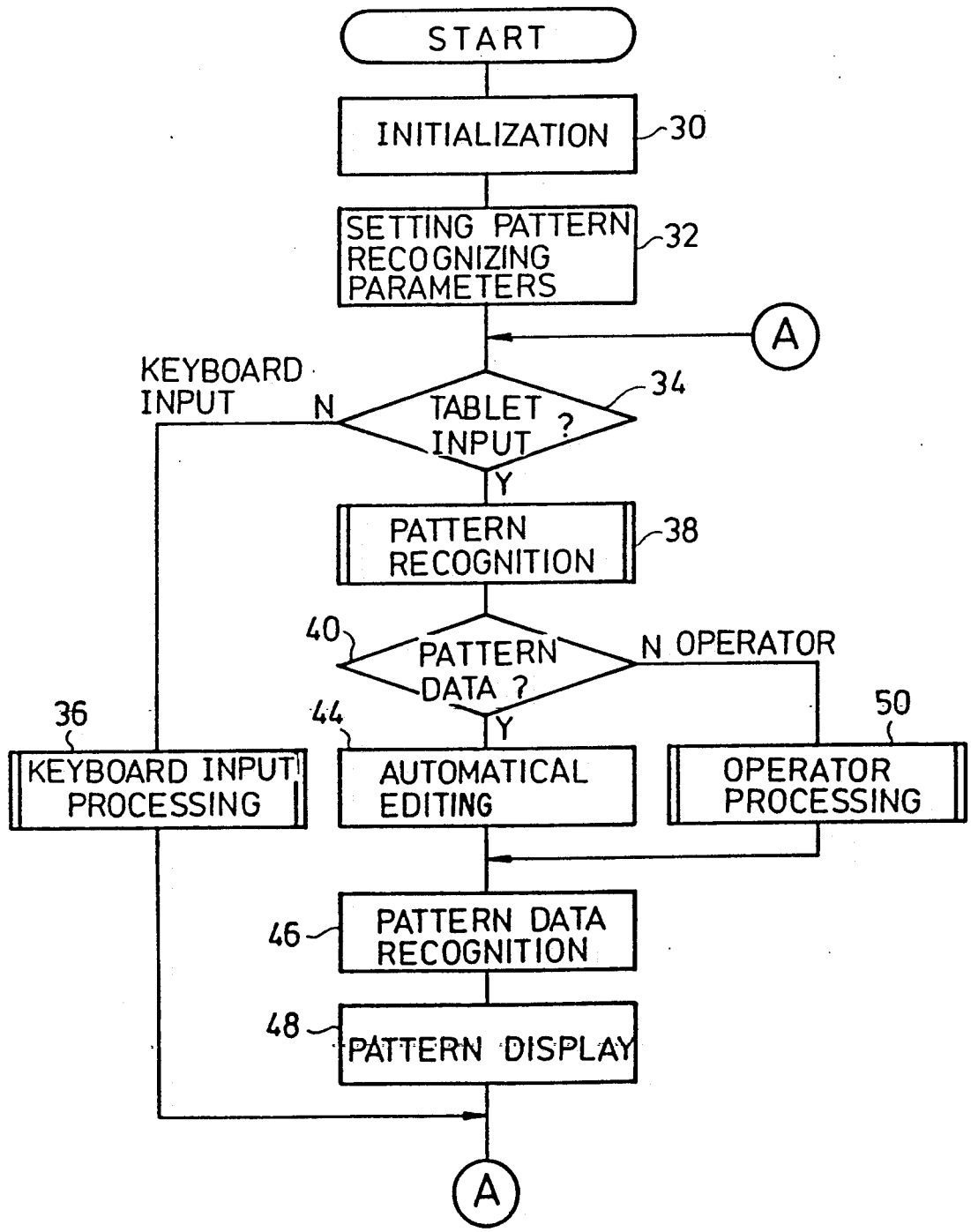
FIG. 1 is a flow chart showing a control routine of an embodiment of the present invention.

When a switch of the context-base input/output system is turned on, the routine shown in FIG. 1 is started. The routine is initialized at Step 30, and pattern recognizing parameters are set at Step 32. These parameters are used to determine which of segment, circle and arc the dot data inputted from the tablet resemble. The parameters may include $\epsilon 1$, $\epsilon 2$ and so on, as will be described in the following, and are additionally prepared, if necessary. At next Step 34, it is determined which the data are inputted from the tablet 16 or the keyboard 14. If it is determined that the data are inputted from the keyboard 14, the keyboard inputting operation is executed at Step 36, as will be described in more detail with reference to FIG. 5.

If, on the other hand, it is determined at the Step 34 that the data are inputted from the tablet 16, the pattern recognition is executed at Step 38. The details of this pattern recognition will be described hereinafter with reference to FIG. 3. At subsequent step 40, it is determined whether the pattern recognized at the Step 38 is one to be drawn or one expressed by a predetermined pattern. If it is determined that the recognized pattern is to be drawn, the pattern is automatically edited at Step 44, and graphic data thereof are then stored at Step 46 until the pattern is displayed in the CRT 12 at Step 48. If, on the other hand, it is determined that the recognized pattern is an operator, the operator is processed at Step 50, and the pattern data are stored at the Step 46 until the routine advances to the Step 48. Incidentally, the operator processing will be described hereinafter.

Figure 3:
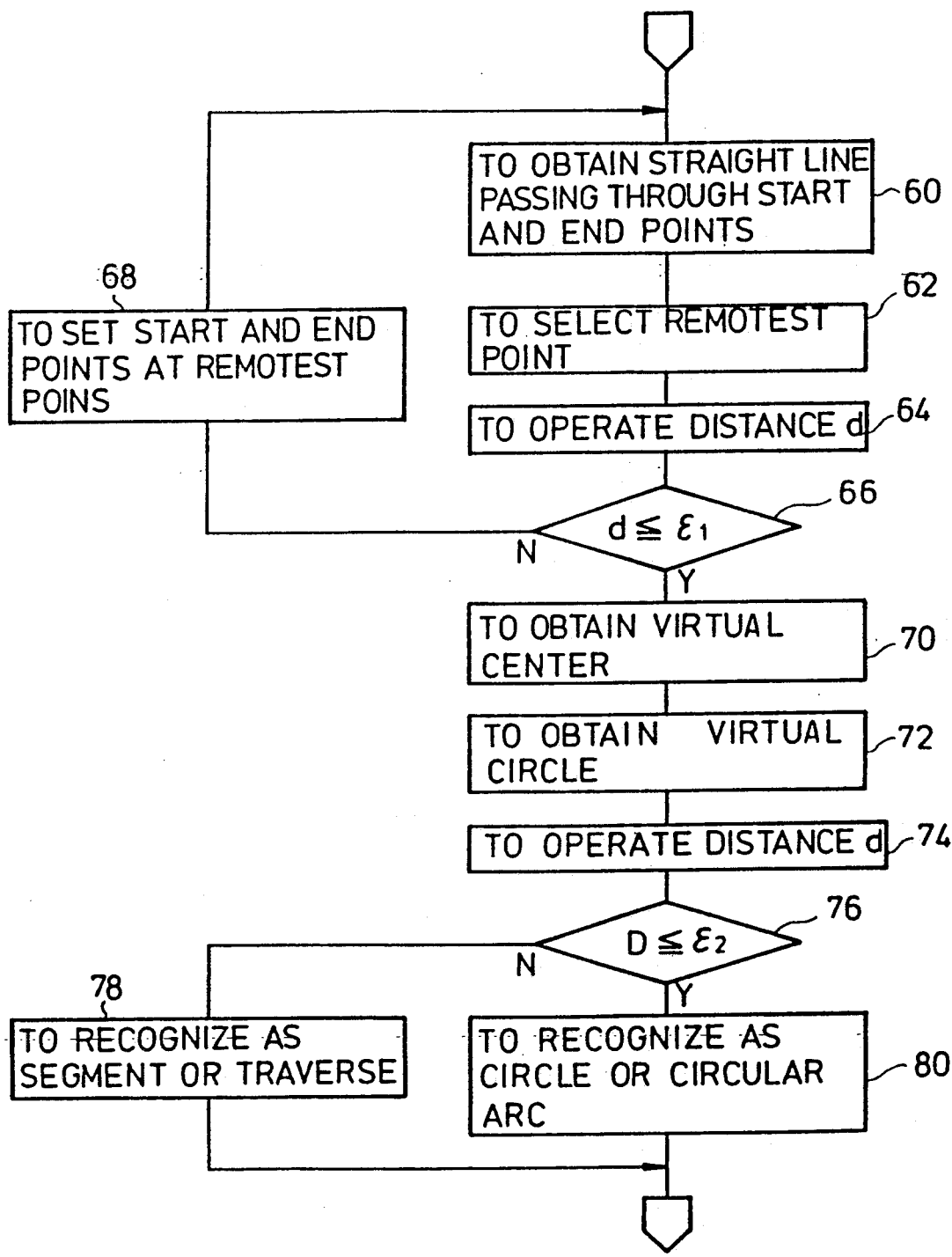
FIG. 3 is a flow chart showing the details of Step 38.
Figure 6:
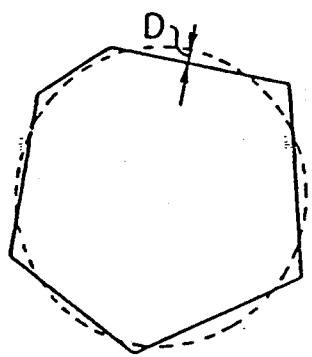
FIGS. 6(A) to 6(G) are diagrams explaining the processing of pattern recognition.

Next, the pattern recognition of the Step 38 will be described with reference to FIG. 3. First of all, the dot data inputted from the tablet 16 takes the shape, as shown in FIG. 6(A), for example. At Step 60, a formula expressing a straight line passing through the start point P1 and the end point P2 of the dot data is arithmetically determined (as shown in FIG. 6(B)). At nest Step 62, one remotest point P3 from that a straight line is selected, and the distance d between the remotest point P3 and the straight line is arithmetically determined (as shown in FIG. 6(C)). At Step 66, the distance d is compared with a parameter $\epsilon 1$. If $d > \epsilon 1$, the remotest point P3 selected at the Step 62 is caused to substitute the start and end points at Step 68, and the routine returns to the Step 60. As a result, the point P3 becomes the end point with respect to the start point P1 and becomes the start point with respect to the end point P2. At the Step 60, formulas of the two straight lines, as shown in FIG. 6(D), are arithmetically determined. At this time, the point P3 becomes a broken point of the traverse passing through the points P1, P3 and P2. At the Step 62, moreover, there are selected remotest points P4 and P5 from those straight lines. If the distances to the points P4 and P5 are larger than the parameter $\epsilon 1$, the formulas of the straight lines P1 to P4, P4 to P3 and P5 to P2 are individually determined (as shown in FIG. 6(E)), as described above. These Steps 60, 62, 64 and 68 are repeated until the distance to the remotest point becomes less than the parameter $\epsilon 1$, so that the traverse shown in FIG. 6(F) can be formed.

At subsequent Step 70, a center of a virtual circle having the circumference or arc resembling that traverse the most data points is determined by determining the perpendicular bisector of one traverse line forming the traverse. At Step 72, a formula of a virtual circle having the virtual center is determined, and the maximum value D of the distance between the virtual circle and the traverse is determined at Step 74 (as shown in FIG. 6(G)). At Step 76, the maximum value D of the distance and a parameter $\epsilon 2$ is compared. If $D \leq \epsilon 2$, it is determined that the virtual circle and the traverse resemble in shape, and this traverse is recognized as the circle or arc.

If $D > \epsilon 2$, on the other hand, it is determined that the traverse fails to resemble the circle, the traverse is recognized as the segment or traverse. This recognized pattern is automatically edited and is then displayed by the CRT.

Figure 4:
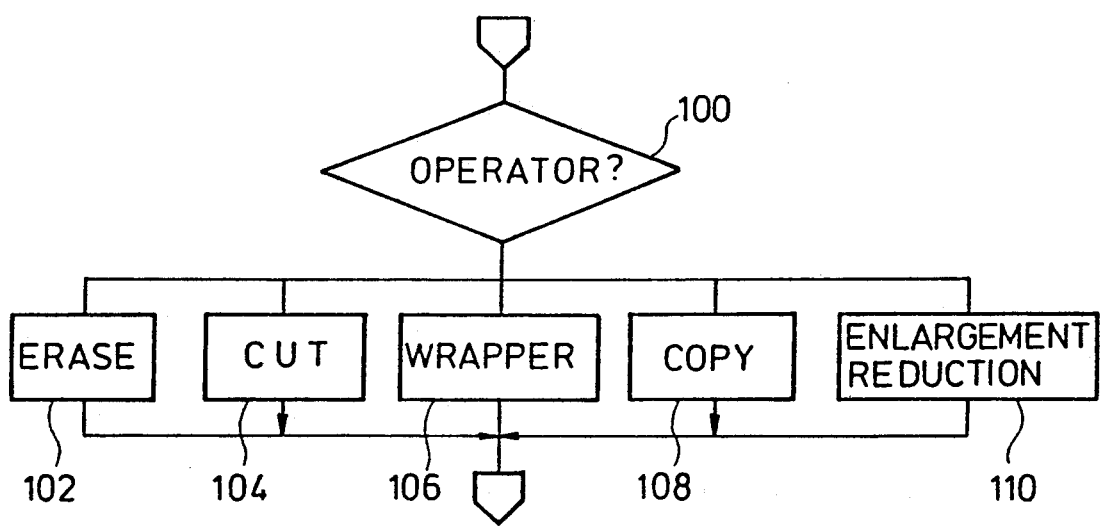
FIG. 4 is a flow chart showing the details of Step 50.

Next, the operator processing will be described with reference to FIG. 4. At first Step 100, it is determined which of the following Table the operator inputted from the tablet belongs to:

TABLE

| Shape of Operator | Command | Function |
| --- | --- | --- |
| X | Erase | Erase designated pattern element |
| / | Cut | Divide designated pattern element |
| (closed) | Wrap | Recognize pattern element in wrapper |
| (wrapper & arrow) | Copy | Copy recognized pattern |
| (wrapper & arrow) | Magnify | Magnify recognized pattern |
| (wrapper & arrow) | Reduce | Reduce recognized pattern |

Figure 7A:
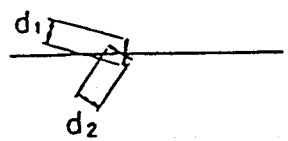
FIGS. 7(A) to 7(C) are diagrams explaining the shape of an operator.
Figure 7B:
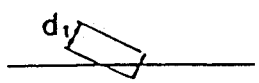
Figure 7C:
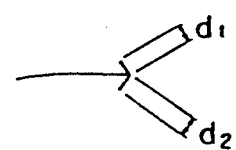

The operator will be described in the following. The symbol "X" designates the operator having a command to erase, which has a function to erase the pattern element designated by an overwrite, as shown in FIG. 7(A). The symbol "/" designates the operator having a command to cut, which has a function to divide across the operator a pattern element designated by the overwrite, as shown in FIG. 7(8). The symbol "", which may take any shape if it is closed, designates the operator having a command to wrap, which has a function to recognize the pattern element enclosed by the closed pattern. By combining a wrapper and an arrow head "→", it is possible to define the operator having the commands to copy, magnify and reduce. The function to copy the pattern recognized by the wrapper can be obtained by combining the arrow head "→" starting from that recognized pattern. The function to magnify the pattern recognized by the wrapper can be obtained by combining the outward arrow head "→" starting from the wrapper. Moreover, the function to reduce the pattern recognized by the wrapper can be obtained by combining the inward arrow head "→" starting from the wrapper. These operators can be discriminated whether the pattern is to be drawn or belongs to the operator, by determining whether or not the individual lengths of the pattern elements composing the operator are less than the parameters d1 and d2, as shown in FIGS. 7(A) to 7(C). The operator is recognized only in case the wrapper and the arrow head "→" are drawn in combination for a short time. If it is determined at the Step 100 that the operator has the command to erase, the designated pattern element is erased from the memory at Step 102. Moreover, the graphic processings, as tabulated above, are executed at Steps 104 to 110.

Figure 5:
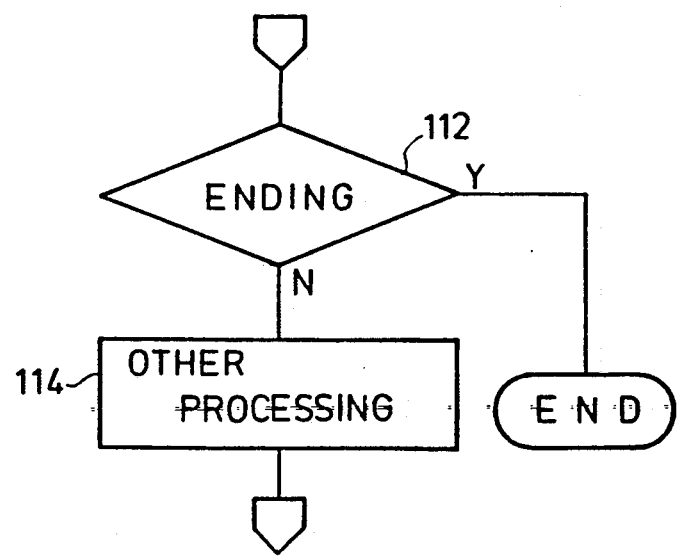
FIG. 5 is a flow chart showing the details of Step 36.

FIG. 5 shows the detail of the Step 36. It is judged at Step 112 whether or not an ending function is selected from a menu displayed by the CRT. If YES, the routine shown in FIG. 1 is ended. Otherwise, the processing according to another function selected according to the menu is executed at Step 114. The function include change of the magnitude of the graphic processing parameter, as has been described at the Step 32, and the store, write, erase, hard copy, all clear and help.

Figure 8A:
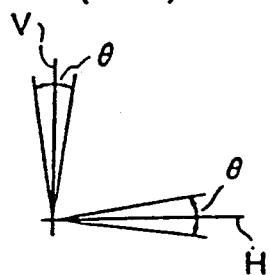
FIGS. 8(A) to 8(C) are diagrams for explaining the automatic edition of a pattern.
Figure 8B:
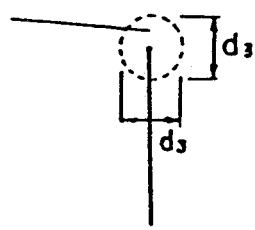
Figure 8C:

Next, the automatic edition of the Step 44 will be described with reference to FIG. 8. First of all, as shown in FIG. 8(A), a center angle θ between a horizontal line H and a vertical line V is set as a parameter. If the segment recognized by the pattern recognition is within the range of the angle θ with respect to the horizontal line H or the vertical line V, it is edited to the horizontal line H or the vertical line V. As shown in FIG. 8(B), moreover, the region of a diameter d3 around the end (point) of one segment is determined in advance. If the region includes a plurality of ends of the individual segments, the ends are connected and edited again, as shown in FIG. 8(C).

Incidentally, the description thus far made is directed to an example in which the pattern inputted is displayed by the CRT. If the tablet used has a display, that CRT can be omitted to accomplish the manual drawing and the pattern display can be executed in the common portion. Moreover, the description thus far made is directed to an example in which the segment, circle or arc is recognized. However, another pattern such as an ellipse may be recognized. As the operator, there may be defined and processed the movement of a pattern, the drawing of symmetric patterns and the drawing of rotation of a pattern. Still moreover, another function of processing the intersection may be added as the editing function.

As has been described hereinbefore, according to the present invention, the graphic data can be inputted and displayed by the drawing operation using the electronic pen without selecting the graphic processing function from the menu. There can be attained an effect that the drawing can be accomplished on the basis of human engineering without feeling any physical disorder.

What is claimed is:

1. A context-base input/output system comprising:
   input means having an electronic pen and a tablet for converting a locus which was drawn by said electronic pen on said tablet into dot data and inputting said dot data;
   first determining means based on the inputted dot data for determining what of at least segment, circle and arc is expressed by said locus;
   display means based on the determination result of said first determining means for displaying the pattern expressed by said locus in a display unit;
   memory means for memorizing graphic processing commands corresponding to a plurality of predetermined patterns for graphic processing, respectively;
   second determining means based on the determination result of said first determining means for determining whether or not said predetermined patterns stored in said memory means are expressed by said locus and identifying any expressed predetermined patterns; and
   processing means based on the determination result of said second determining means for graphic processing in response to the graphic processing commands corresponding to said predetermined patterns identified by said second determining means.

2. A context-base input/output system according to claim 1, wherein said graphic processing commands identified by said electronic pen are displayed on said tablet of said input means.

3. A context-base input/output system according to claim 1, wherein said graphic processing commands include at least one member selected from the group consisting of: the function to erase a designated pattern element; the step of dividing a designated pattern element into a plurality of pattern elements; the step of copying a designated pattern; the function of magnifying a designated pattern; and the function of reducing a designated pattern.

4. A context-base input/output system according to claim 1, wherein said second determining means is based on the length of each element of the pattern determined by said first determining means for determining whether the pattern corresponds to the graphic processing command or is to be drawn.

5. A context-base input/output system according to claim 1, wherein said display means is based on a determination result of said first determining means for displaying the pattern expressed by said locus on said display unit after the same has been automatically edited.

6. A context-base input/output system according to claim 5, wherein said automatic edition edits the segment determined by said first determining means into a horizontal or vertical line in the screen of said display unit if the angle between said horizontal or vertical line and said segment is no more than a predetermined value.

7. A context-base input/output system according to claim 5, wherein said automatic edition edits the end points of a plurality of segments, which are determined by said first determining means, so that they may be connected, if the distance between said end points is no more than a predetermined value.

8. A context-base input/output system comprising:
   input means having an electronic pen and a tablet for converting a pattern, which is manually drawn with said electronic pen on said tablet, into dot data to input said dot data;
   first determining means based on the inputted dot data for determining what of patterns geometrically defined said manually drawn pattern resembles;
   display means for displaying the geometrically defined pattern determined by said first determining means in a display unit after the same has been automatically edited;
   memory means for memorizing graphic processing commands corresponding to a plurality of predetermined patterns for graphic processing, respectively;
   second determining means for determining whether or not the geometrically defined pattern judged by said first determining means expresses said predetermined patterns stored in said memory means and identifying any expressed predetermined patterns; and processing means for graphic processing in response to the commands corresponding to said predetermined patterns identified by said second determining means if it is determined by said second determining means that said predetermined patterns are expressed.

9. A context base input/output system according to claim 8, wherein said first determining means executes:
   a. the step of determining a straight line passing through start and end points of the dot data inputted;
   b. the step of selecting from said dot data the remotest point having the maximum distance from said straight line;
   c. the step of converting said straight line into a traverse having said remotest point as a broken point if said maximum distance exceeds a predetermined value;
   d. the step of selecting from said dot data one remotest point having the maximum distance from the individual traverse lines composing said traverse;
   e. the step of converting said traverse lines into a traverse having said remotest point as a broken point if said distance exceeds said predetermined value;
   f. the step of repeating the steps d and e until said maximum distance is exceeded by said predetermined value;
   g. the steps of determining a circle resembling the most the traverse which is finally determined; and
   h. the step of determining that said locus expresses said circle or arc, if the maximum distance between the finally determined traverse and said circle is less than said predetermined value, and that said locus expresses said segment or traverse if said maximum distance exceeds said predetermined value.

10. A context-base input/output system according to claim 8, wherein said graphic processing commands include at least one member selected from the group consisting of: the function to erase a designated geometrically defined pattern element; the step of dividing a designated geometrically defined pattern element into a plurality of pattern elements; the step of copying a designated geometrically defined pattern; the function of magnifying a designated geometrically defined pattern; and the function of reducing a designated pattern which is geometrically defined.

11. A context-base input/output system according to claim 8, wherein said second determining means is based on the length of each element of the geometrically defined pattern determined by said first determining means for determining whether the pattern corresponds to a graphic processing command or is to be drawn.

12. A context-base input/output system according to claim 8, wherein said display means is based on a determination result of said first determining means for displaying the geometrically defined pattern expressed by said locus on said display unit after the same has been automatically edited.

13. A context-base input/output system according to claim 12, wherein said automatic edition edits the segment determined by said first determining means into a horizontal or vertical line in the screen of said display unit if the angle between said horizontal or vertical line and said segment is no more than a predetermined value.

14. A context-base input/output system according to claim 12, wherein said automatic edition edits the end points of a plurality of segments, which are determined by said first determining means, so that they may be connected, if the distance between said end points is no more than a predetermined value.

15. A context-base input/output system according to claim 8, wherein said graphic processing commands identified by said electronic pen are displayed on said tablet of said input means.

16. A context-base input/output system, comprising:
   input means having an electronic pen and a tablet for converting a locus which was drawn by said electronic pen on said tablet into dot data and inputting said dot data;
   first determining means based on the inputted dot data for determining what of at least segment, circle and arc is expressed by said locus;
   display means based on the determination result of said first determining means for displaying the pattern expressed by said locus in a display unit;
   memory means for memorizing graphic processing commands corresponding to a plurality of predetermined patterns for graphic processing, respectively;
   second determining means based on the determination result of said first determining means for determining whether or not said predetermined patterns stored in said memory means are expressed by said locus and identifying any expressed predetermined patterns; and
   processing means based on the determination result of said second determining means for graphic processing in response to the graphic processing commands corresponding to said predetermined patterns identified by said second determining means
   wherein said first determining means executes:
   a. the step of determining a straight lien passing through start and end points of the dot data inputted;
   b. the step of selecting from said dot data the remotest point having the maximum distance from said straight line;
   c. the step of converting said straight line into a traverse having said remotest point as a broken point if said maximum distance exceeds a predetermined value;
   d. the step of selecting from said dot data one remotest point having the maximum distance from the individual traverse lines composing said traverse;
   e. the step of converting said traverse lines into a traverse having said remotest point as a broken point if said distance exceeds said predetermined value;
   f. the step of repeating the steps d and e until said maximum distance is exceeded by said redetermined value;
   g. the step of determining a circle resembling the most the traverse which is finally determined; and
   h. the step of determining that said locus expresses said circle or arc, if the maximum distance between the finally determined traverse and said circle is less than said predetermined value, and that said locus expresses said segment or traverse if said maximum distance exceeds said predetermined value.

* * * * *